United States Patent
Soltau et al.

(10) Patent No.: US 7,980,358 B2
(45) Date of Patent: Jul. 19, 2011

(54) LIGHTWEIGHT, SOUND-INSULATING LINING FOR A BODY PART OF A MOTOR VEHICLE, AND METHOD FOR THE PRODUCTION THEREOF

(75) Inventors: Dirk Soltau, Düsseldorf (DE); Michael Hansen, Cologne (DE); Thomas Gross, Wermelskirchen (DE); Dagmar Ulbrich, Monheim (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/450,190

(22) PCT Filed: Apr. 16, 2008

(86) PCT No.: PCT/EP2008/054604
§ 371 (c)(1),
(2), (4) Date: Sep. 15, 2009

(87) PCT Pub. No.: WO2008/135357
PCT Pub. Date: Nov. 13, 2008

(65) Prior Publication Data
US 2010/0065366 A1    Mar. 18, 2010

(30) Foreign Application Priority Data

May 2, 2007 (DE) .......................... 10 2007 020 832

(51) Int. Cl.
*E04B 1/82* (2006.01)
*E04B 1/84* (2006.01)
*F02B 77/13* (2006.01)
*E04B 1/74* (2006.01)
*E04B 1/62* (2006.01)
*B62D 33/06* (2006.01)

(52) U.S. Cl. ........ 181/286; 181/204; 181/290; 296/39.3
(58) Field of Classification Search .................. 181/286, 181/204, 205, 290, 294; 296/39.3, 39.1, 296/97.23, 1.03; 180/69.22, 69.23
See application file for complete search history.

(56) References Cited

U.S. PATENT DOCUMENTS 3,816,233 A * 6/1974 Powers .......................... 428/213
(Continued)

FOREIGN PATENT DOCUMENTS

DE    27 35 153    2/1979
(Continued)

OTHER PUBLICATIONS

International Search Report, Mar. 9, 2008.

*Primary Examiner* — Edgardo San Martin
(74) *Attorney, Agent, or Firm* — Collard & Roe, P.C.

(57) ABSTRACT

The invention relates to a lightweight sound insulating lining (1) for a body component of a motor vehicle, in particular in the form of a lightweight front wall lining, comprising a sound absorbing layer, a sound insulating layer which is directly connected to the sound absorbing layer and substantially air tight, as well as an adjoining foam layer (1.3), wherein the sound absorbing layer (1.1) is made of a porous absorber, preferably a fiber fleece or a foam, which has an air permeability in the range of 150 to 2000 liters/m$^2$s at a test pressure of 100 Pa. The sound insulating layer (1.2) is formed by an integral skin layer of the foam layer (1.3) with a thickness of at least 0.5 mm, and is integrally joined to the porous absorber by back-foaming the porous absorber substantially without foam penetration therethrough. Furthermore, a method for manufacturing such a lining is disclosed.

23 Claims, 5 Drawing Sheets

U.S. PATENT DOCUMENTS

| | | | | |
|---|---|---|---|---|
| 3,936,555 | A * | 2/1976 | Smith, II | 428/151 |
| 4,101,704 | A * | 7/1978 | Hiles | 428/218 |
| 4,438,166 | A * | 3/1984 | Gluck et al. | 428/113 |
| 4,476,183 | A * | 10/1984 | Holtrop et al. | 442/372 |
| 4,529,639 | A * | 7/1985 | Peoples et al. | 428/95 |
| 5,064,714 | A * | 11/1991 | Yamaguchi et al. | 428/219 |
| 5,094,318 | A * | 3/1992 | Maeda et al. | 181/290 |
| 5,518,806 | A * | 5/1996 | Eder et al. | 428/218 |
| 5,554,831 | A * | 9/1996 | Matsukawa et al. | 181/294 |
| 5,817,408 | A | 10/1998 | Orimo et al. | |
| 5,925,207 | A * | 7/1999 | Itoh et al. | 156/216 |
| 5,932,331 | A * | 8/1999 | Jones et al. | 428/218 |
| 6,572,723 | B1 * | 6/2003 | Tilton et al. | 156/219 |
| 6,659,223 | B2 * | 12/2003 | Allison et al. | 181/290 |
| 6,669,265 | B2 * | 12/2003 | Tilton et al. | 296/146.1 |
| 6,695,374 | B1 * | 2/2004 | Gebreselassie et al. | 296/24.3 |
| 6,802,389 | B2 * | 10/2004 | Tompson et al. | 181/290 |
| 6,846,169 | B2 * | 1/2005 | Kobayashi et al. | 425/120 |
| 6,955,845 | B1 * | 10/2005 | Poole et al. | 428/76 |
| 7,055,649 | B2 * | 6/2006 | Tompson et al. | 181/290 |
| 7,070,848 | B2 * | 7/2006 | Campbell | 428/137 |
| 7,080,712 | B2 * | 7/2006 | Tsuiki et al. | 181/204 |
| 7,318,498 | B2 * | 1/2008 | Woodman et al. | 181/290 |
| 7,320,739 | B2 * | 1/2008 | Thompson et al. | 156/308.2 |
| 7,566,475 | B2 * | 7/2009 | Connelly et al. | 427/195 |
| 7,585,559 | B2 * | 9/2009 | Schroeder et al. | 428/319.1 |
| 2005/0093203 | A1 | 5/2005 | Kobayashi et al. | |
| 2006/0118355 | A1* | 6/2006 | Blomeling et al. | 181/286 |
| 2006/0289231 | A1 | 12/2006 | Priebe et al. | |
| 2007/0065644 | A1* | 3/2007 | Blomeling | 428/158 |
| 2007/0287001 | A1* | 12/2007 | Carlson et al. | 428/304.4 |
| 2008/0264555 | A1* | 10/2008 | Blomeling | 156/245 |
| 2010/0108437 | A1* | 5/2010 | Bayle et al. | 181/286 |

FOREIGN PATENT DOCUMENTS

| | | |
|---|---|---|
| DE | 197 42 198 | 4/1998 |
| DE | 10 2004 054 646 | 6/2006 |
| DE | 10 2005 056 840 | 4/2007 |

* cited by examiner

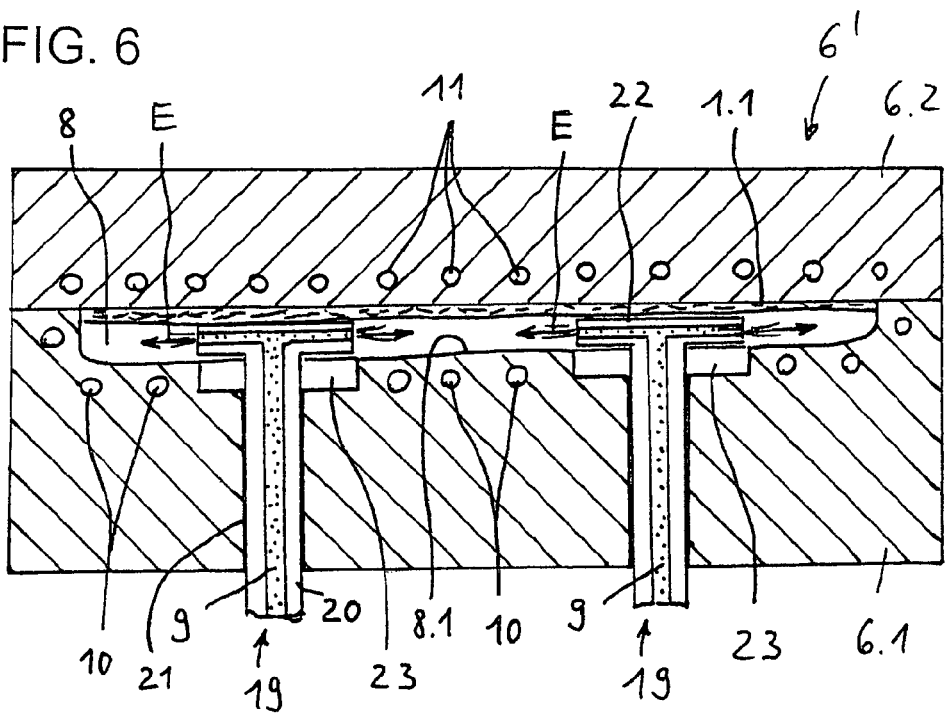
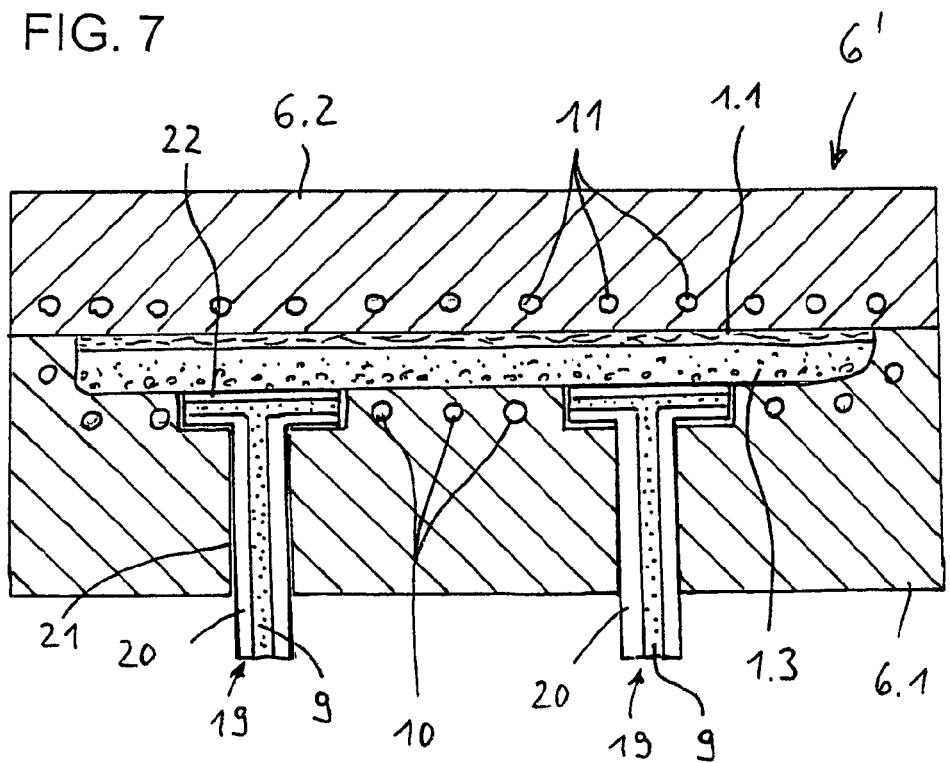

LIGHTWEIGHT, SOUND-INSULATING LINING FOR A BODY PART OF A MOTOR VEHICLE, AND METHOD FOR THE PRODUCTION THEREOF

CROSS REFERENCE TO RELATED APPLICATIONS

This application is the National Stage of PCT/EP2008/054604 filed on Apr. 16, 2008, which claims priority under 35 U.S.C. §119 of German Application No. 10 2007 020 832.6 filed on May 2, 2007. The international application under PCT article 21(2) was not published in English.

The invention relates to a lightweight sound absorbing lining for a body component of a motor vehicle, in particular in the form of a lightweight front wall lining, comprising a sound absorbing layer, a sound insulating layer which is directly connected to the sound absorbing layer and substantially air-tight, as well as an adjoining foam layer. Furthermore, the invention relates to a manufacturing method for such a lining.

Conventional front wall linings for motor vehicles are configured from a sound insulating heavy layer and from a foam layer or a textile fleece layer, wherein the foam layer or the fleece layer act as an elastic spring and the heavy layer acts as a mass of an acoustic spring-mass-system. As a heavy layer, mats or molded parts made of thermoplastic elastomer (TPE) or EPDM are used, which often contain a filler, for example barium sulfate or calcium carbonate. The heavy layer has a relatively high weight. Often, it has a weight per area from 2 to 4 $kg/m^2$, occasionally even a weight per area between 4 and 8 $kg/m^2$. Usually, a polyurethane soft foam or a fleece layer made of polyester or cotton fibers are used as an elastic spring. Thus, the weight per area of such front wall linings usually is in the range of more than 3.5 $kg/m^2$ which is undesirable with respect to reducing the total weight of a vehicle or the fuel consumption, respectively. In particular when the side of the heavy layer opposite to the foam layer is covered with a sound absorbing layer, for example polyethylene terephthalate fleece, for improving the sound absorbing capacity, a correspondingly time-consuming and expensive manufacturing process for such front wall linings results due to the relatively high number of different materials used.

From DE 27 35 153 A1, a spring-mass-system with low specific weight is known, which is configured as a double mat, which is comprised of soft polyurethane foam with open pores and a cover layer of filled heavy polyurethane foam, and which is intended in particular as a front wall lining for a motor vehicle. The heavy polyurethane foam is configured as integral foam and comprises a shore-hardness A of 80 to 90, and comprises an additional filler content of 400% to 500% by weight. In order to achieve said hardness specification of the cover layer, a polyol mix made of commercial hard foam polyol and commercial soft foam polyol is used. The cover layer and the polyurethane soft foam layer are connected to each other by back-foaming, wherein the cover layer is inserted into a mold and back-foamed with the soft polyurethane foam. The production of said double mat is relatively time and cost intensive.

It is the object of the present invention to provide a sound insulating as well as sound absorbing lining, in particular a front wall lining for motor vehicles, which has a low weight and which can be realized at relatively low cost. Furthermore, a cost effective method for producing such sound insulating lining shall be provided.

This object is achieved primarily by a lining comprising the features of claim 1.

The lining according to the invention comprises a sound absorbing layer, a sound insulating layer which is substantially air-tight and directly connected to the sound absorbing layer, as well as an adjoining foam layer. The sound absorbing layer is made of a porous absorber, preferably a fiber fleece or foam which has an air permeability in the range of 150 to 2000 liters/$m^2$s at a test pressure of 100 Pa. According to the invention, the sound insulating layer is formed by an integral skin layer of the foam layer with a thickness of at least 0.5 mm, wherein the sound insulating layer is integrally joined to the porous absorber by back-foaming the same substantially without foam penetration therethrough.

The sound insulating layer and the foam layer are produced from the same basic materials in a single processing step and are integrally connected to each other in the finished lining. Preferably the foam layer is a soft polyurethane foam layer having a substantially pore-free skin layer serving as the sound insulating layer. By avoiding the heavy layer made of a different material, for example ethylene propylene diene caoutchouc, as well as omitting the processing step of gluing a sound absorbing layer onto the heavy layer or the sound insulating layer, respectively, the lining according to the invention achieves a substantial reduction of weight as well as cost savings.

The porous absorber which preferably consists of fiber fleece or open-pore foam is integrally joined to the sound insulating layer (skin layer) without gluing. Due to its relatively high air permeability, the porous absorber has a high sound absorption capacity. However, the high air permeability of the porous absorber is disadvantageous with respect to preventing foam penetration during back-foaming the absorber. This problem, however, was solved by the inventors through favorable proceedings of the method such that the sound absorption capacity of the porous absorber is hardly affected by the back-foaming process.

According to an advantageous embodiment of the lining according to the invention, it is provided that the sound insulating layer locally has surface portions with a different thickness, the difference in thickness being at least 1 mm, in particular at least 2 mm. In this way the sound insulating effect of the lining having a reduced weight can be optimized in consideration of the generally irregular distribution of sound levels.

Regarding the method of manufacturing the lining according to the invention, the object mentioned above is achieved by the method comprising the features of claim 16.

The method according to the invention is substantially characterized in that a porous sound absorbing layer, which is preferably made of fiber fleece or an open-pore foam and which has an air permeability in the range of 150 to 2000 liters/$m^2$s at a test pressure of 100 Pa, is directly back-foamed with a reactive mix containing polyol and isocyanate in a foaming mold, wherein the reactive mix is fed into the foaming mold substantially parallel to the backside of the sound absorbing layer and/or parallel to the bottom surface of a cavity of the foaming mold, and wherein a predetermined portion of the surface of the foaming mold is temperature-controlled in such a way and/or the mixture ratio of polyol to isocyanate is altered during feeding in such a way that a foam layer results from the reactive mix, said foam layer has a substantially air-tight, integral skin layer with a thickness of at least 0.5 mm which is integrally joined to the sound absorbing layer substantially without penetration of foam. By feeding or providing an ongoing flow, respectively, of the reactive mix parallel to the backside of the porous absorber a penetration of foam or a bleeding through the porous absorber is prevented.

The method according to the invention permits the use of standard fiber fleeces, in particular volume fleeces made of polyethylene fibers, polypropylene fibers, a mixture of polyethylene and polypropylene fibers, cotton fibers or a mixture of polyethylene and natural fibers. The fiber fleece used in the lining according to the invention does not need to have a special surface treatment; also, it does not require special impregnation. Thus the fiber fleece of the lining according to the invention may be a standard material.

In a preferred embodiment of the method according to the invention a limited volume of the reactive mix is fed into the foaming mold in such a way that the reactive mix does not contact the porous absorber at first, wherein the integral connection between the reactive mix and the porous absorber occurs later on when the reactive mix is fully cured.

In other words, the reactive mix is fed into the foaming mold in such a way that the porous absorber "floats" on the reactive mix during termination of reaction (expansion). To this end, the porous absorber can be fixed or attached to the bottom side of a top foaming mold half.

Further preferred and advantageous embodiments of the lining according to the invention as well as the method for producing the same are provided in the dependent claims. In the following, the invention will be described in detail referring to the drawing in which several embodiments are illustrated schematically. In the drawing:

FIG. 6 shows a sectional view of another foaming mold for manufacturing a lining according to the invention at the beginning of the injection phase;

FIG. 7 shows a sectional view of the foaming mold of FIG. 6 after termination of the injection phase;

The sound insulating lining according to the invention is preferably formed as an inner front wall lining 1 for a motor vehicle 2. In principle, it may also be formed as a sound insulating lining for other body parts of a motor vehicle, for example as a hood lining or a roof lining.

Figure 1:
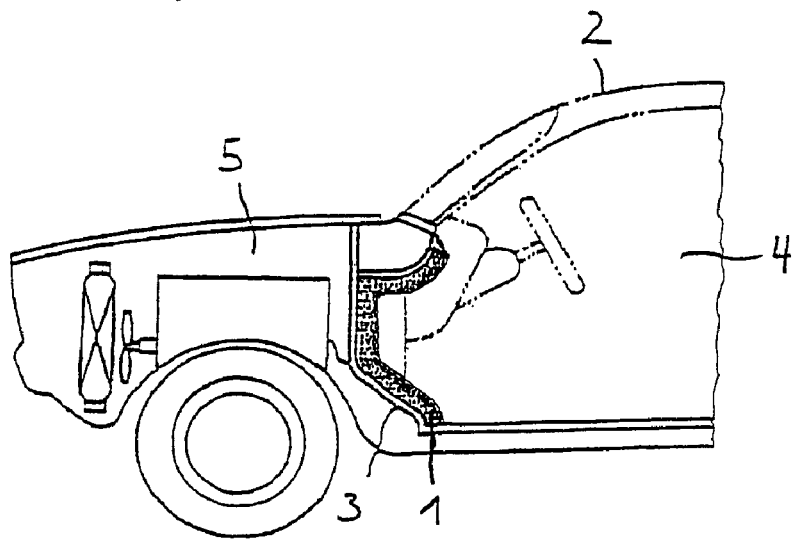
FIG. 1 shows a sectional view of the front part of a motor vehicle with a sound insulating lining arranged on the inside of the front wall separating the passenger compartment from the engine compartment.

In the embodiment shown in FIG. 1 the lining 1 is adapted to the inner contour of the front wall 3 separating passenger compartment 4 and engine compartment 5.

The lining 1 is self-supporting and is characterized by an advantageous feature a relatively low weight. The total weight per area is for example less than 2.500 g/m², preferably less than 2.000 g/m². It has a sound absorbing layer 1.1, a substantially airtight sound insulating layer 1.2 and an adjoining foam layer 1.3. The sound absorbing layer 1.1 is made of fiber fleece. In contrast, the sound insulating layer 1.2 consists of an integral skin layer of a polyurethane soft foam layer with a thickness of at least 0.5 mm. The sound insulating layer (skin layer) 1.2 is integrally joined to the fiber fleece 1.1. For this purpose, the fiber fleece 1.1 is back-foamed with a reactive mix containing polyol and isocyanate, preferably in one shot (one-shot-process), i.e. in a one step process.

Back-foaming of the fiber fleece 1.1 is performed in such a way that foam penetration through the fiber fleece is prevented. Thus the sound absorbing properties of the fiber fleece 1.1 remain substantially unchanged. To this end, for example the direction of the injection flow E of the reactive mix is oriented parallel to the bottom side of the fiber fleece 1.1 or to the surface of the lower foaming mold half, respectively.

The fiber fleece 1.1 is formed from polyethylene fibers, polypropylene fibers, a mixture of polyethylene and polypropylene fibers, cotton fibers or a mixture of polyethylene and natural fibers. In particular, the fleece may be a volume fleece. It has an air permeability in the range of 150 to 2000 liters/m²s (determined at a test pressure of 100 Pa). Its length-specific flow resistance is in the range of 5 kNs/m⁴ to 40 kNs/m⁴, preferably in the range of 5 kNs/m⁴ to 25 kNs/m⁴.

The fiber fleece 1.1 did not undergo a special mechanical and/or chemical surface treatment, e.g. impregnation. The fiber fleece 1.1 used for back-foaming is cut for example from a fiber fleece sheet as a two-dimensional punched part. Across the cross section, the fiber fleece has a substantially uniform density as well as a substantially uniform flow resistance. Thus a low-cost standard material can be used as the fiber fleece for the lining according to the invention.

The weight per area of the fiber fleece 1.1 is in the range of 100 g/m² to 1600 g/m², preferably in the range of 100 g/m² to 1200 g/m². The sheet thickness of the fiber fleece 1.1 is for example 2 mm to 30 mm, particularly 5 mm to 20 mm.

For producing the sound insulating layer 1.2, the skin formation of the polyurethane soft foam when the components of its mixture are fully cured in the foaming mold is used. The thickness and density of the insulating layer 1.2 is controlled or influenced by means of the recipe of the reactive mix and/or the mold temperature. The thickness of the sound insulating layer 1.2 is for example 1 mm to 5 mm. The raw density is for example in the range of 0.08 to 2.0 g/cm³, preferably in the range of 0.08 to 1.4 g/cm³. In contrast, the raw density of the foam layer 1.3 lies in the range of 0.02 to 0.1 g/cm³, for example in the range of 0.02 to 0.06 g/cm³.

Back-foaming of the fiber fleece 1.1 may be performed in a closed as well as in an open foaming mold. Now the manufacture of the lining according to the invention will be explained referring to FIGS. 4 to 10.

Figure 4:
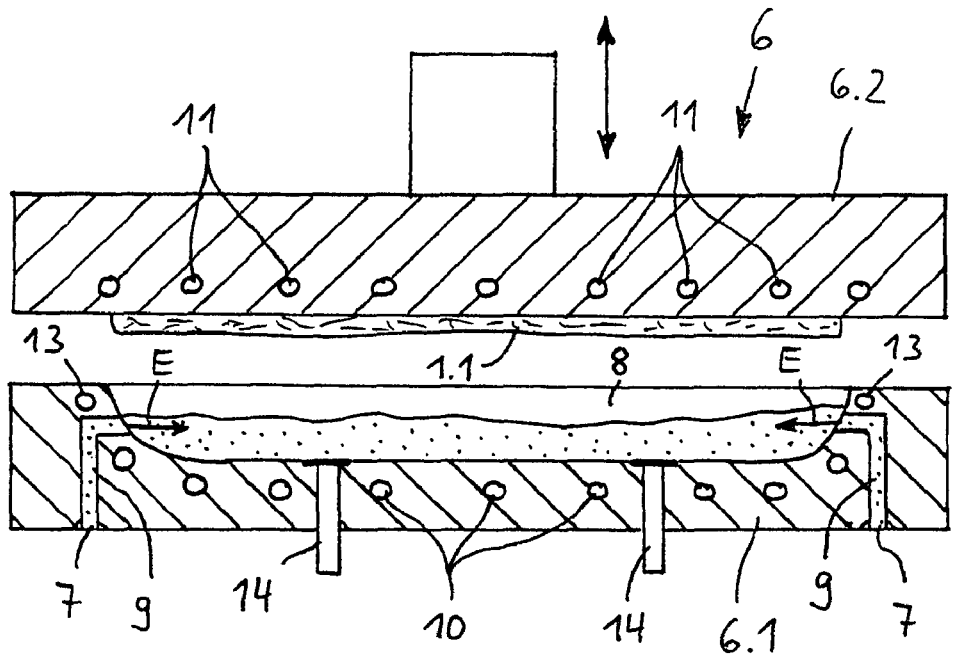
FIG. 4 shows a sectional view of an open foaming mold for manufacturing a lining according to the invention at the end of the injection phase.
Figure 5:
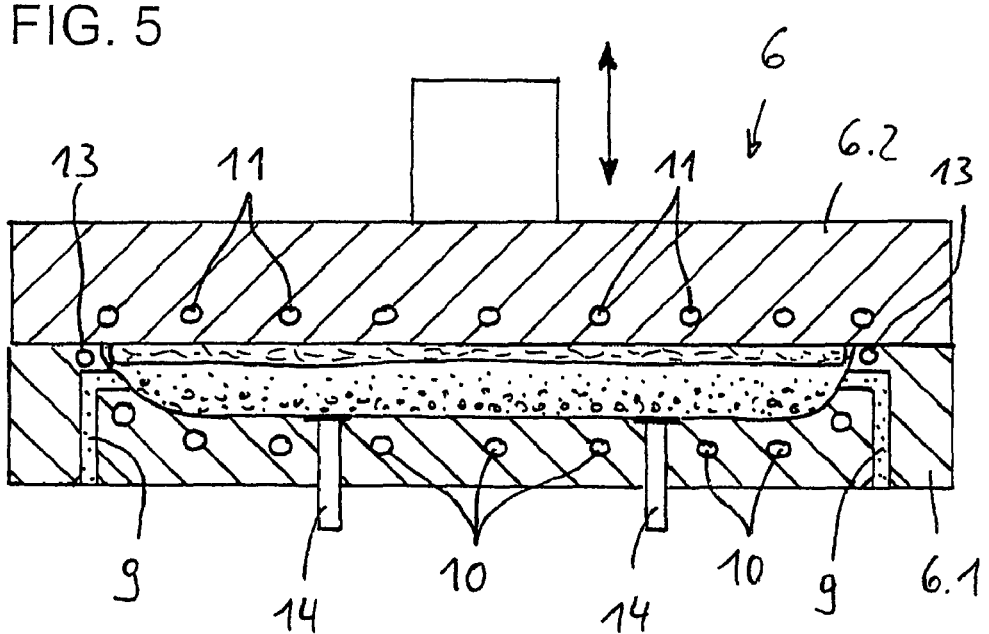
FIG. 5 shows a sectional view of the foaming mold of FIG. 4 in its closed state.

FIG. 4 schematically shows a foaming mold 6 comprising several components. Additional parts of the plant, such as storage tanks, containers with a mixer, dosing pumps, piping, mixing heads etc. are omitted for the purpose of clarity. The main components (isocyanate and polyol) of the reactive mix are fed from storage tanks into intermediate containers, brought to the required temperature and fed via dosing units to a mixing head (not shown) which is connected to one or multiple gates 7 of the bottom foaming mold half 6.1.

A filler can be added to the reactive mix or to its main components, respectively. As a filler barium sulfate and/or chalk can be used. However, optionally a filler may be omitted. The filler ($BaSO_4$ and/or chalk) is combined with $CO_2$, if necessary. By adding $CO_2$ the raw density of the soft foam layer 1.3 can be reduced.

The foaming mold 6 has a bottom mold half 6.1 and a top mold half 6.2 which together in the closed position of the mold define a mold cavity 8 corresponding to the lining to be manufactured. The top mold half 6.2 can be raised and lowered relative to the bottom mold half 6.1.

At the bottom side of the mold half 6.2 a blank of a fiber fleece 1.1 is removably fixed. The blank is produced for example by punching. At the bottom side of the mold half 6.2 needles, in particular barbed needles, Velcro strips, gripping elements or the like, for example, can be provided for removably fixing the fiber fleece 1.1.

The reactive mix is fed into the mold cavity 8 through one or multiple feeding channels 9 provided in the bottom mold half (mold half) 6.2. Each of the feeding channels is designed in such a way that the injection flow direction E of the reactive mix is oriented substantially parallel to the bottom side of the fiber fleece 1.1 or the bottom surface 8.1 of the mold cavity, respectively.

Injection of the reactive mix into the mold cavity 8 is performed in the open condition of the foaming mold 6. Thus the reactive mix does not contact the fiber fleece 1.1 at first. After a limited or predetermined volume of the reactive mix has been fed into the foaming mold 6, the foaming mold is closed. The direct integral connection between the reactive mix and the fiber fleece 1.1 occurs during the reactive mix expanding in the cavity 8 is fully cured. Here the fiber fleece 1.1 practically floats on the rising polyurethane soft foam.

The foaming mold 6 is provided with a temperature control device comprising fluid channels integrated into the mold halves 6.1, 6.2 which can be individually controlled, by means of which predetermined surface areas of the foaming mold 6 defining the cavity 8 can be brought to a desired temperature (cooled).

Temperature control of surface areas of the foaming mold 6 in the present context means relative cooling of the corresponding surface areas relative to the soft foam reactive mix which has a higher temperature.

The bottom mold half 6.1 has a group of fluid channels 10 connected to a common fluid supply manifold (not shown) and a common fluid discharging collective pipe (not shown). The temperature of the fluid supplied to this group of fluid channels is controlled such that the mold surface adjacent to the fluid channels 10 has a temperature in the range of 50° C. to 90° C., for example about 70° C.±15° C., or that a temperature in the temperature range mentioned is reached, respectively.

The fluid channels 11 integrated into the top mold half 6.2 form a second group of fluid channels which are connected to a different common fluid supply manifold (not shown) and to another collective pipe (not shown) discharging this fluid, wherein the temperature of the fluid is controlled such that the surface of the top mold half 6.2 adjacent to these fluid channels 11 has a temperature in the range of 15° C. to 60° C., for example about 35° C.±15° C., or that a temperature in the temperature range mentioned is reached, respectively.

The temperature difference between the surfaces of the mold halves 6.1, 6.2 defining the cavity is at least 15° C., preferably at least 25° C.

The foam structure of the soft foam layer is substantially created by the propellant gases originated during chemical cross-linking of the reactive mix. Optionally added $CO_2$ supports the foaming process. Due to the relative cooling of the surface of the top mold half 6.2 with respect to the surface of the bottom mold half 6.1, the foaming process in the reactive mix is suppressed in the section bordering the cooler mold surface such that an integral, substantially pore-free skin 1.2 with a thickness of at least 0.5 mm, preferably at least 0.8 mm, more preferably at least 1 mm is generated. The skin acts as the sound insulating layer 1.2. It is preferably airtight or at least substantially airtight. The skin 1.2 is integrally joined to the backside of the fiber fleece 1.1.

When attached to the foaming mold 6, the fiber fleece 1.1 has a temperature which is substantially below the temperature of the surface of the top mold half 6.1. According to an advantageous embodiment of the invention it is provided to cool down the fiber fleece 1.1 to a temperature in the range of 10° C. to 15° C. and to fix it in the cooled state to the top mold half 6.2. On the warmer outer surface of the bottom mold half 6.2 an open-pore sound absorber 1.3 is formed by the foaming process having an open-pore surface or only a very thin skin 1.4, this thin skin 1.4 being sound permeable or sound transparent. The sound permeable skin 1.4 has a thickness of less than 400 μm, preferably less than 250 μm. For example, it is thinner than 150 μm and may also be formed only partially.

Figure 2:
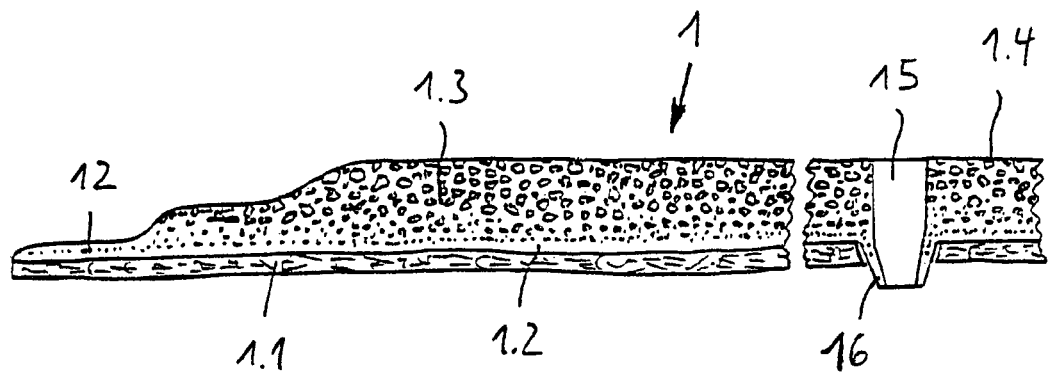
FIG. 2 shows a sectional view of a part of the lining according to the invention.

If required, the lining 1 according to the invention has on its edge a flexible sealing lip 12 to compensate for possibly existing work tolerances, thus assuring a tight fit of the lining 1 to adjacent components or body sections (see FIG. 2).

To achieve a substantially pore-free formation of the sealing lip 12, the bottom mold half 6.1 has fluid channels 13 close to the section of the cavity corresponding to the sealing lip, which also are connected to the fluid manifold (not shown) assigned to the second group of fluid channels 10. The fluid flowing through the fluid channels 10 and 13 thus has the same temperature.

Furthermore, pushers 14 are integrated into the bottom mold half 6.1 to eject the finished molded part, i.e. the lining 1, after opening the foaming mold 6.

In numerous sound insulating linings for body parts, openings have to be provided for example for passing cables, tubes and/or mechanic devices. As is shown in FIG. 2, at an opening 15 for a cable or a tube, an elastically expandable grommet 16 for sealingly passing the cable or the tube is preferably formed on the side of the lining 1 provided with the skin, i.e. on the side which has the integral, substantially pore-free skin 1.2.

Figure 3:
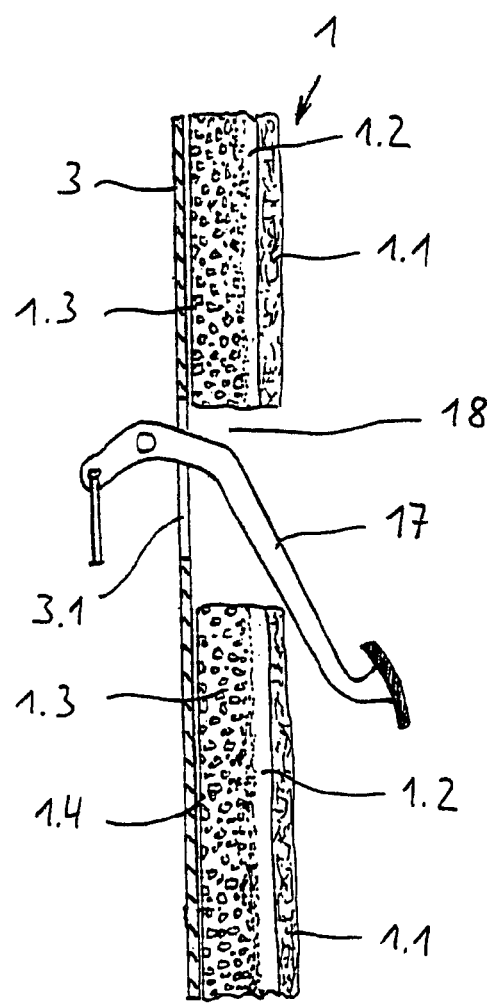
FIG. 3 shows a sectional view of a part of another embodiment of a lining according to the invention.

FIG. 3 schematically shows a sectional view of a part of the front wall 3 of a motor vehicle with a pedal assembly 17 reaching through an opening 3.1 of the front wall. At the inner side of the front wall 3 a lining 1 according to the invention is arranged comprising an opening 18 for the pedal assembly 17.

FIGS. 6 and 7 schematically show another foaming mold 6' for manufacturing a lining 1 according to the invention. In contrast to the foaming mold 6 according to FIG. 4, slidable injecting elements 19 are fit into the bottom mold half 6.1. The injecting elements 19 each have a tube portion 20 which is received axially slidable in a bore 21 of the bottom mold half 6.1. The tube portion 20 is provided with a deviating element 22 at its end facing towards the cavity 8 of the foaming mold 6', through which deviating element the reactive mix containing polyol and isocyanate is radially deviated relative to the tube portion. The deviating element 22 makes sure that the reactive mix will not be injected onto the fiber fleece 1.1 in a substantially perpendicular direction. Due to the deviating element 22, the injection flow direction E of the reactive mix is oriented substantially parallel to the surface of the fiber fleece 1.1 or the bottom surface 8.1 of the cavity 8, respectively. The deviating element 22 may be embodied as a disc-shaped plate, for example.

However, in the method according to the invention it is altogether possible that the reactive mix comes in direct contact with the fiber fleece 1.1 during injection into the cavity 8 and flows along the bottom side of the fiber fleece. The injection flow direction E and thus the principle direction of flow or the pressure force of the reactive mix, respectively, are however oriented substantially parallel to the bottom side of the fiber fleece 1.1. Thus a substantially laminar flow of the reactive mix parallel to the bottom side of the fiber fleece 1.1 occurs.

Moreover, within the scope of the invention the porous sound absorber layer 1.1 (for example fiber fleece) can be provided only partially in one of more parts of the lining 1 according to the invention. This is especially true for an opening for passing a cable or a tube through the lining 1 according to the invention. In such an area, where no fiber fleece 1.1 is provided, the reactive mix may also be injected (shot) into the cavity in a perpendicular direction against the top mold half 6.2. In the area of the fiber fleece 1.1, however, it will be not injected perpendicularly against the fleece, but substantially parallel to its bottom side.

The ends of the bores 21 opening into the cavity 8 each are extended by means of a recess 23 into which the deviating element 22 is retracted after finishing the injection phase. The injection elements 19 additionally act as pushers (ejector pins) to eject the finished molded part from the mold cavity.

As an alternative, the reactive mix may also be sprayed or poured into the cavity of a temperature-controlled mold, and then a blank of fiber fleece 1.1 is put onto the top of the supplied reactive mix. During this process, the top surface of the newly coated soft foam and/or the fiber fleece 1.1 is preferably cooled relative to the temperature-controlled mold. Preferably, the fiber fleece blank is fixed by means of a retainer with respect to the rising reactive mix. Thus the fiber fleece 1.1 "floats" during expansion (foaming) of the reactive mix on the soft foam layer 1.3 and integrally bonds during curing of the foam with the integral, substantially airtight skin 1.2 of the soft foam layer 1.3.

Figure 10:
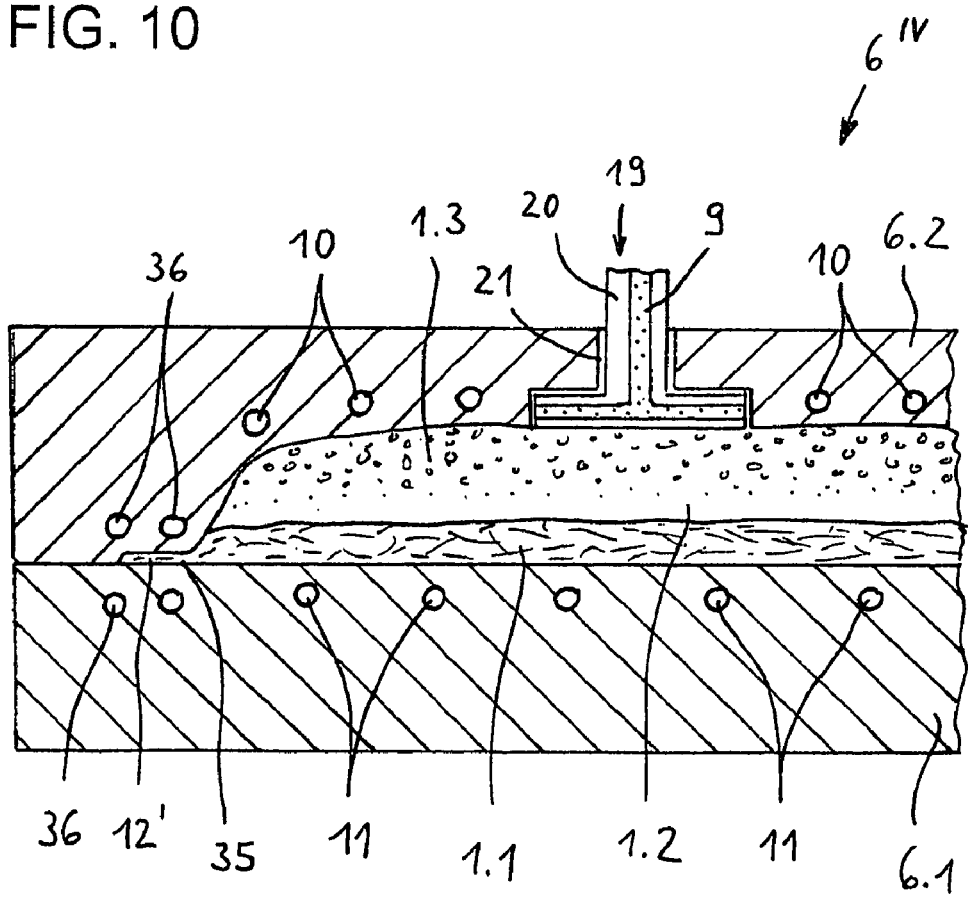
FIG. 10 shows a sectional view of a part of another foaming mold for manufacturing a lining according to the invention after termination of the injection phase.
Figure 8:
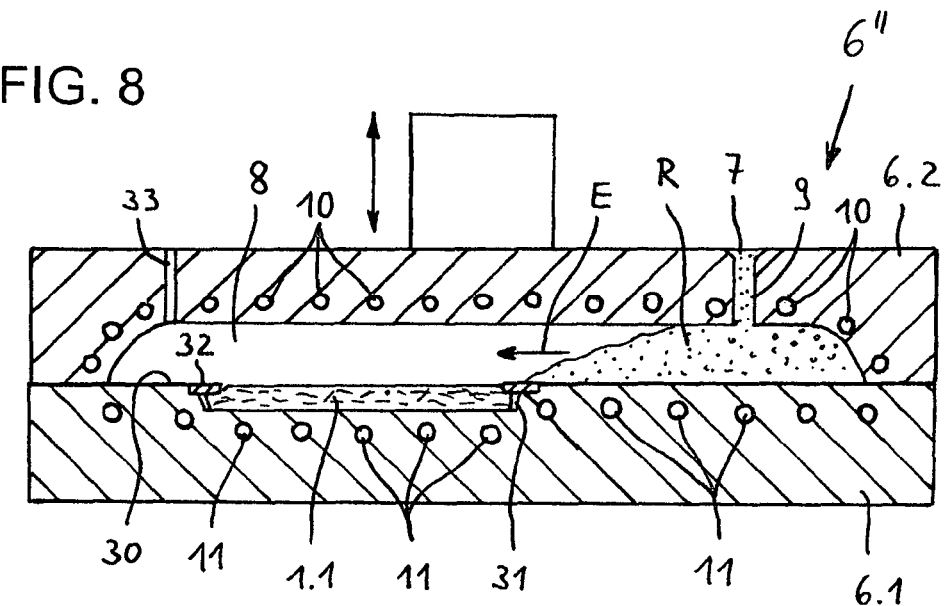
FIG. 8 shows a sectional view of another foaming mold for manufacturing a lining according to the invention at the beginning of an injection phase.
Figure 9:
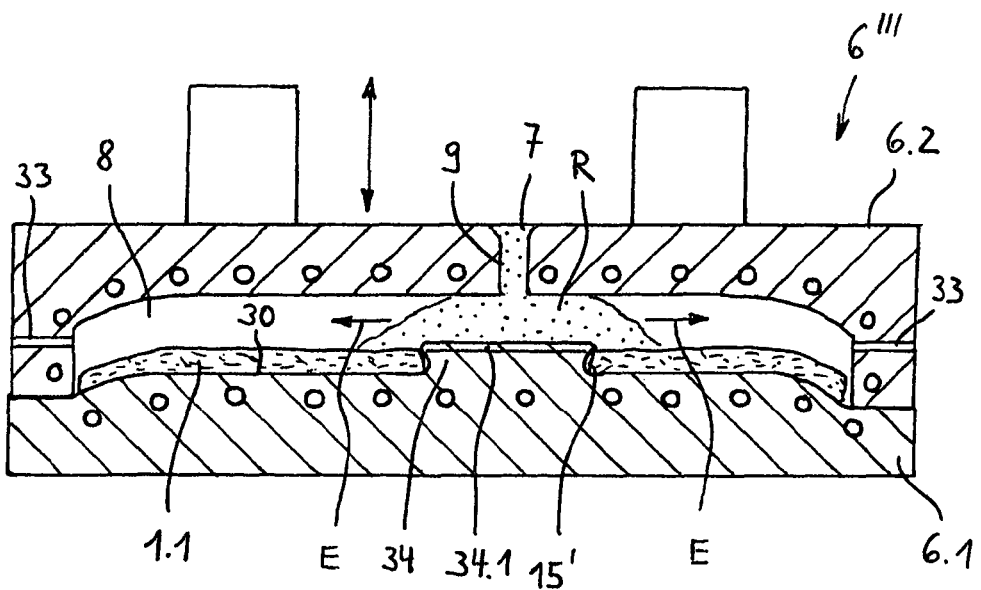
FIG. 9 shows a sectional view of another foaming mold for manufacturing a lining according to the invention at the beginning of an injection phase.

FIGS. 8 to 10 schematically show additional multi-piece foaming molds for manufacturing linings according to the invention.

The sound absorber layer 1.1 composed of a porous absorber, preferably a fiber fleece, in particular volume fleece, or of an open cell air permeable foam can be arranged partially or over the complete surface at one side of the foamed sound insulating layer 1.2.

A lining according to the invention where only a part of the surface of the sound insulating layer 1.2 is covered by a sound absorbing layer can be produced by means of a foaming mold 6", an example of which is outlined in FIG. 8. The bottom mold half 6.1 defines a mold wall (mold surface) 30 in which at least one recess (pocket) 31 for receiving a blank of the porous air permeable sound absorbing layer 1.1 is formed. The cavity defined by the recess 31 is substantially completely filled by the absorber blank 1.1 inserted therein. At the edge of the recess 31 or at its transition into the mold wall 30 of the mold half 6.1, respectively, a circumferential frame 32 is attached. The frame 32 prevents the reactive mix R injected into the cavity 8 of the foaming mold 6" for producing the foam layer from flowing under the sound absorbing layer 1.1. The frame 32 covers the edge of the sound absorbing layer 1.1 and extends outward beyond the edge of the recess 31. The frame 32 has a flat shape and is made of steel, for example. It is coated with a release agent (anti-stick agent).

The at least one injection channel 9 (a so-called point of injection) of the foaming mold 6" is arranged in such a way relative to the at least one recess 31 receiving a sound absorbing layer that the reactive mix R is supplied into the foaming mold 6" substantially parallel to the back surface of the sound absorbing layer 1.1. In FIG. 8, an arrow E indicates that the reactive mix R fed into the cavity through the injection channel 9 flows substantially parallel to the back surface of the absorber blank 1.1 inserted into the recess 31. Furthermore, the foaming mold is provided with a venting bore 33 opening into the cavity 8, which is formed in the top mold half 6.2, for example.

Reference numbers 10 and 11 again indicate different groups of fluid channels. Through the fluid channels 10 a fluid with a temperature in the range of 50° C. to 90° C. is passed, while a fluid with a temperature in the range of 15° C. to 60° C. is passed through the fluid channels 11. The temperatures of the fluids are controlled in such a way that between the surfaces of the mold half 6.1, 6.2 defining the cavity a temperature difference of at least 15° C., preferably at least 20° C. occurs.

FIG. 9 shows a foaming mold 6''' for manufacturing a lining according to the invention which shall be provided with at least one opening for passing through a line and/or a mechanical component. For this purpose, a blank of the absorbing layer 1.1 is used in which the at least one opening 15' is already cut out.

The mold wall 30 of the foaming mold defining the cavity 8 is provided with at least one pedestal- or stub-shaped projection 34 which is assigned to the opening 15' of the sound absorbing layer 1.1. The projection 34 penetrates the opening 15' of the sound absorbing layer 1.1 when it is inserted into the cavity 8 of the foaming mold 6'''. The projection 34 has a circumferential undercut such that it covers the edge of the opening 15' on the back side of the sound absorbing layer 1.1 which is subjected to backing-foaming, thus preventing the injected reactive mix R from flowing to the front side of the sound absorbing layer 1.1 through the opening 15'. This undercut is formed for example by a baffle 34.1 which is mounted to the front end of the projection 34.

With the exception of the projection 34 penetrating through a respective opening 15', the sound absorbing layer 1.1 covers substantially the complete surface of the mold wall 30 of the mold half 6.1 defining the cavity 8. The at least one injection channel 9 (point of injection 7) of the foaming mold 6''' opens opposite of the baffle 34.1 or the front surface of the projection 34 into the cavity 8 so that the reactive mix R injected into the mold cavity is fed into the foaming mold substantially parallel to the backside of the sound absorbing layer 1.1, as indicated by arrows E in FIG. 9. Again, the foaming mold 6''' is provided with venting channels 33 opening into the cavity 8 close to the outer edge of the inserted sound absorbing layer 1.1.

Another advantageous embodiment of the lining according to the invention provides that a flexible sealing lip 12' is formed solely by its sound absorbing layer. To this end, the sound absorbing layer 1.1 is pressed at the edge, i.e. permanently compacted. In this condition, it extends laterally beyond the edge of the foamed sound insulating layer 1.2. The sealing lip 12' may extend along the complete circumference or only along one or multiple sections of the edge of the sound insulating layer 1.2.

The compressed edge of the sound absorbing layer 1.1 which is preferably made from a thermoplastic fleece is illustrated in FIG. 10. The top mold half 6.2 and the bottom mold half 6.1 of the foaming mold 6$^{IV}$ form a pinching section 35 at the edge of the cavity. The sound absorbing layer 1.1 put on the bottom mold half 6.1 is dimensioned such that its edge will be clamped in the pinching section 35 of the closed foaming mold 6$^{IV}$. Clamping the sound absorbing layer 1.1 at the edge prevents the reactive mix injected into the closed cavity from flowing around the edge of the sound absorbing layer 1.1. Supply of the reactive mix for back-foaming the sound absorbing layer 1.1 is performed by means of one or several axially slidable injection elements 19 corresponding to the injection elements 19 shown in FIGS. 6 and 7. The thickness of the air permeable thermoplastic sound absorbing layer 1.1 is for example in the range of 10 mm to 20 mm. In contrast, the thickness of the flexible sealing lip 12' is about 2 to 3 mm. The foaming mold 6$^{IV}$ has a heating device assigned to the pinching section 35 which is able to heat up the edge of the thermoplastic sound absorbing layer 1.1 compacted in this section to a temperature above 100° C., for example 120° C. In the embodiment shown, the heating device comprises fluid channels 36 in which an appropriate liquid circulates, for example oil. As an alternative, the heating device may comprise electric heating elements. Moreover, the foaming mold 6$^{IV}$ again is provided with fluid channels 10, 11, wherein the temperatures of the fluids flowing therein are controlled in the same way as mentioned above referring to FIG. 8.

According to another preferred embodiment of the lining according to the invention, it is provided that the porous absorber 1.1 or a cover fleece attached additionally is made of a flame retardant fiber fleece, preferably made of polyester fleece. In this case, the lining is preferably finished in such a way that it has a temperature resistance of at least 150° C. In this way, the lining according to the invention can be used advantageously near the engine of a motor vehicle or in areas experiencing a similar temperature load.

The execution of the invention is not limited to the embodiments described above. Thus, different variations are conceivable which use the idea of the invention reflected in the claims even when embodied differently. In this way, instead of the fiber fleece also a porous open pore foam can be used as sound absorbing layer. Moreover, the lining 1 according to the invention may also comprise several partial sound insulating areas, i.e. several integral, substantially pore-free, air impermeable skin areas at a distance from each other, which are specifically arranged on the lining 1 according to the acoustic requirements of sound insulation.

The invention claimed is:

1. A lightweight sound insulating front wall lining for a body component of a motor vehicle, comprising a sound absorbing layer, a sound insulating layer which is directly connected to the sound absorbing layer and substantially air tight, as well as an adjoining foam layer, wherein the sound absorbing layer is made of a porous absorber, wherein the porous absorber has an air permeability in the range of 150 to 2000 liters/m$^2$s at a test pressure of 100 Pa, wherein the sound insulating layer is formed by an integral skin layer of the foam layer with a thickness of at least 0.5 mm and integrally joined to the porous absorber by back-foaming the porous absorber substantially without penetration of foam, wherein the lining has on its edge a flexible sealing lip.

2. The lining according to claim 1, wherein the porous absorber has a length-specific flow resistance in the range of 5 kNs/m$^4$ to 40 kNs/m$^4$.

3. The lining according to claim 1, wherein the porous absorber has a substantially uniform density as well as a substantially uniform flow resistance across its cross section.

4. The lining according to claim 1, wherein the porous absorber has at least one of a weight per area of 100 g/m$^2$ to 1600 g/m$^2$ and a thickness in the range of 2 mm to 30 mm.

5. The lining according to claim 1, wherein the porous absorber is made of a fiber fleece made of polyethylene fibers, polypropylene fibers, a mixture of polyethylene and polypropylene fibers, cotton fibers or a mixture of polyethylene and natural fibers.

6. The lining according to claim 1, wherein the sound insulating layer has a thickness in the range of 1 mm to 5 mm.

7. The lining according to claim 1, wherein the sound insulating layer has a raw density in the range of 0.08 to 2.0 g/cm$^3$.

8. The lining according to claim 1, wherein the sound insulating layer locally has areas of different thickness, the difference in thickness being at least 1 mm.

9. The lining according to claim 1, wherein the foam layer has a raw density in the range of 0.02 to 0.1 g/cm$^3$.

10. The lining according to claim 1, wherein the total weight per area is less than 2500 g/m$^2$.

11. The lining according to claim 1, wherein the sound insulating layer covers substantially the entire surface of the porous absorber.

12. The lining according to claim 1, wherein the sound insulating layer is covered only partially by the porous absorber.

13. The lining according to claim 1, wherein solely its sound absorbing layer forms a flexible sealing lip.

14. The lining according to claim 1, wherein has a temperature resistance of at least 150° C.

15. The lining according to claim 1, wherein the porous absorber is made of a flame retardant fiber fleece.

16. A method for manufacturing a lightweight sound insulating front wall lining for a body component of a motor vehicle, wherein a porous sound absorbing layer is directly back-foamed with a reactive mix containing polyol and isocyanate in a foaming mold wherein as a porous sound absorbing layer an absorber is used which has an air permeability in the range of 150 to 2000 liters/m$^2$s at a test pressure of 100 Pa, wherein the reactive mix is fed into the foaming mold substantially parallel to at least one of the backside of the sound absorbing layer and the bottom surface of a cavity of the foaming mold, and wherein a foam layer results from the reactive mix due to at least one of the following two steps:
   (1) a predetermined portion of the surface of the foaming mold is temperature-controlled, and
   (2) the mixture ratio of polyol to isocyanate is altered during feeding
   wherein said foam layer has a substantially air-tight, integral skin layer with a thickness of at least 0.5 mm which is firmly bonded to the sound absorbing layer substantially without foam penetration therethrough,
   wherein the reactive mix is injected into the closed foaming mold using a deviating device, wherein the deviating device forces the reactive mix into an injection flow direction directed substantially parallel to the backside of the porous sound absorbing layer.

17. The method according to claim 16, wherein a limited volume of the reactive mix is fed into the foaming mold in such a way that the reactive mix does not contact the porous sound absorbing layer at first, wherein the integral joint between the reactive mix and the porous sound absorbing layer occurs subsequently upon fully curing of the reactive mix.

18. The method according to claim 16, wherein back-foaming of the porous sound absorbing layer is performed in an open foaming mold.

19. The method according to claim 16, wherein back-foaming of the porous sound absorbing layer is performed in a closed foaming mold.

20. The method according to claim 16, wherein the porous sound absorbing layer used has a substantially uniform density as well as a substantially uniform flow resistance across its cross section.

21. The method according to claim 16, wherein the porous sound absorbing layer has a length-specific flow resistance in the range of 5 kNs/m$^4$ to 40 kNs/m$^4$.

22. The method according to claim 16, wherein the porous sound absorbing layer has at least one of a weight per area of 100 g/m$^2$ to 1600 g/m$^2$ and a thickness in the range of 2 mm to 30 mm.

23. The method according to claim 16, wherein the porous sound absorbing layer used is made of polyethylene fibers, polypropylene fibers, a mixture of polyethylene and polypropylene fibers, cotton fibers or a mixture of polyethylene and natural fibers.

* * * * *